(12) United States Patent
Hartman (10) Patent No.: US 8,672,333 B2
(45) Date of Patent: Mar. 18, 2014

(54) TORQUE TRANSMITTING APPARATUS FOR A WHEEL

(76) Inventor: John Hartman, Cuyahoga Falls, OH (US)

( * ) Notice: Subject to any disclaimer, the term of this patent is extended or adjusted under 35 U.S.C. 154(b) by 240 days.

(21) Appl. No.: 13/158,596

(22) Filed: Jun. 13, 2011

(65) Prior Publication Data

US 2012/0313334 A1  Dec. 13, 2012

(51) Int. Cl.
*B60S 9/22* (2006.01)

(52) U.S. Cl.
USPC .............................. 280/3; 280/761

(58) Field of Classification Search
USPC ............ 280/3, 1.5, 47.11, 761, 186, DIG. 11; 301/38.1, 33, 39.1, 41.1, 42, 49, 53, 5; 180/904, 19.3; 254/418, 120
See application file for complete search history.

(56) References Cited

U.S. PATENT DOCUMENTS

| | | |
|---|---|---|
| 724,437 A | 4/1903 | Clary |
| 1,096,378 A | 5/1914 | Lawrence |
| 1,373,352 A * | 3/1921 | Rice .................................. 280/3 |
| 1,408,561 A | 5/1922 | Carman |
| 1,631,900 A | 7/1927 | Temperley |
| 1,733,959 A * | 10/1929 | Gerben ......................... 301/38.1 |
| 1,750,478 A * | 3/1930 | Koehler ......................... 152/375 |
| 2,786,690 A * | 3/1957 | Tharp ................................. 280/3 |
| 3,439,764 A * | 4/1969 | Kimball ........................... 180/12 |
| 3,482,847 A * | 12/1969 | Hart .................................. 280/3 |
| 4,125,029 A | 11/1978 | Krezak |
| 4,321,956 A * | 3/1982 | Martinelli ..................... 152/222 |
| 4,463,961 A | 8/1984 | Fernandez |
| 4,589,509 A | 5/1986 | Chase |
| 4,687,070 A | 8/1987 | Ricciardi |
| 4,883,280 A | 11/1989 | Christian |
| 4,915,185 A | 4/1990 | Olson |
| 5,338,047 A * | 8/1994 | Knisley .............................. 280/3 |
| 6,027,877 A * | 2/2000 | Wagner, Jr. .................. 435/6.12 |

FOREIGN PATENT DOCUMENTS

DE   3127287   * 2/1983
WO   2008047088   4/2008

* cited by examiner

*Primary Examiner* — Anne Marie M Boehler (57) ABSTRACT

A vehicle moving apparatus includes a torque transmitter (16) positioned on the outer circular plane of a wheel with a tire (15). A collar (50), is positioned on the inside circular plane of the tire (15) and flexible linear-force elements (31), routed radially around the outer diameter of the tire (15), connect the collar (50) to the torque transmitter (16). A source of torque or a torque arm (71) can be connected to the torque transmitter (16) that enables a single user to move a vehicle.

20 Claims, 7 Drawing Sheets

TORQUE TRANSMITTING APPARATUS FOR A WHEEL

FIELD OF THE INVENTION

The present invention relates to vehicle movers. More particularly, the present invention relates to a device and method for coupling a torque source to a wheel with a tire.

BACKGROUND OF THE INVENTION

The need to move a vehicle using alternative propulsion is an inherent side effect of wheeled vehicles, such as automobiles, trailers, and aircraft. When the primary propulsion system is disabled it may be necessary to move the vehicle out of traffic or to a more convenient location for maintenance. It is commonly thought that in order to move a vehicle manually, without the aid of a towing vehicle, you must push the vehicle by applying a linear force to the vehicle directed in the proposed direction of motion. However, the effectiveness of the applied force can be increased by applying a circumferential force to a radial arm connected to a weight bearing wheel of a vehicle, which creates a torque upon the wheel. Torque offers an advantage for the manual application of force due to the mechanical advantage offered by the arm length. A longer arm produces greater force on the wheel without requiring greater input.

Some conventional manual torque arms grip a wheel's outer perimeter. This may be accomplished by pinching a radially distal profile section of the wheel, such as a steel wheel of a rail car. Others do so by clamping onto a wheel (or tire) by pulling from the wheel's axle and pushing radially inward onto the outer perimeter surface of the wheel to achieve the necessary grip to turn the wheel. For example, U.S. Pat. No. 724,437 to Clary, U.S. Pat. No. 1,096,378 to Lawrence, U.S. Pat. No. 1,408,561 to Carman, and U.S. Pat. No. 4,915,185 to Olson each disclose known manual torque application devices. These devices are limiting in that they need unimpeded access to a wheel's outer area, and are therefore not suited to modern vehicles with wheel wells or fenders. In a few cases, such as, for example, U.S. Pat. No. 4,883,280 to Christian, the arm of the torque application device needs attachment points at both the inner and outer ends of the axle of the wheel, which also prevents use with modern vehicles that have brake, suspension, or other structures on the vehicle side of the wheel.

There are several other examples of radial arms mounted to wheels, such as, for example, U.S. Pat. No. 1,631,900 to Temperley, U.S. Pat. No. 4,463,961 to Fernandez, and G.B. WO 2008/047088 to Malloy. These examples are related in that they each require a feature that is permanently mounted to a wheel such as a sprocket, flange, or hub. These permanently mounted additions would not be acceptable on most modern vehicles because they are aesthetically unappealing, and they do not have the convenience of a universal fitment because not every vehicle wheel would have the hardware needed to connect the radial arm.

Another example of a device designed to affect a torque onto a wheel with a tire uses a roller driven by either a motor or by a radial arm. The roller is pressed into the tire, usually by forming a wedge between the tire and a surface rolled upon by the tire, which requires that the apparatus must negotiate the same surface as the tire. For example, U.S. Pat. No. 4,125,029 to Krezak, U.S. Pat. No. 4,589,509 to Chase, and U.S. Pat. No. 4,687,070 to Ricciardi each disclose such a device. These devices are limited by the amount of friction that can be maintained between the roller and the tire. This limitation is exacerbated by the need to roll along the same surface as the tire which necessitates a relatively smooth surface to keep the rollers from losing friction with the tire.

Thus, there is a need for an improved device for applying torque to a wheel.

SUMMARY OF THE INVENTION

In general, a torque transmitting device according to the present invention includes a torque transmitter adapted to be positioned on an outer axial surface of a vehicle wheel and to transmit a torque force applied by a torque source; a collar adapted to be positioned on the inner axial surface of the tire; and a plurality of linear force elements extending between the torque transmitter and the collar.

In accordance with at least one aspect of the present invention, a torque transmitting device includes a torque transmitter adapted to be positioned on an outer axial surface of a vehicle wheel, the torque transmitter including a frame, a plurality of radially oriented adjustable arms extending from the frame, and a foot secured to a distal end of each of the adjustable arms on an axially inner edge, the foot being adapted to engage the tire; a torque source engaged with the torque transmitter and adapted to apply a torque force to the torque transmitter; and a plurality of linear force elements extending from the torque transmitter and adapted to rotationally engage the vehicle wheel to transmit the torque force to the vehicle.

In accordance with at least one aspect of the present invention, a method of applying torque to a wheel includes the steps of positioning a collar of a vehicle moving apparatus on an axially inner plane of a tire; anchoring a torque transmitter to the collar from the axially outer plane of the tire using a plurality of flexible linear force elements; and applying a torque force to the torque transmitter to rotate the tire and move the vehicle.

BRIEF DESCRIPTION OF THE DRAWINGS

For a full understanding of the invention reference should be made to the following detailed description and the accompanying drawings, wherein.

DETAILED DESCRIPTION OF THE ILLUSTRATIVE EMBODIMENTS

A vehicle mover according to the concepts of the present invention is shown in FIGS. 1-8 and is indicated generally by the numeral 1A. A direction 14 is used in the Figures and throughout this disclosure to define an axially outward direction, and all axial references will be relative to direction 14. Direction 14 is normal to the circular plane of a wheel of a vehicle in a typical installation of the vehicle mover 1A, and it is pointed away from the vehicle.

A torque transmitter 16 (FIGS. 1 & 2) has a frame 17 that supports the other device components and provides strength to the vehicle mover. The frame 17 shown in the drawings is substantially triangular, and is made from sheet metal of sufficient thickness to withstand the forces generated by the vehicle mover. The perimeter edges of frame 17 are bent axially inward to be perpendicular for added strength. It will be appreciated by those skilled in the art that frames 17 of other shapes are acceptable. In addition, other materials and fabrication techniques may be used, such as, for example, plastics and molds.

An axle 18 is rigidly affixed at approximately the planer center of an axially outward plane of frame 17. Axle 18 (FIG. 2) includes a flange 19, a shoulder 20, and a gripping provision or a spline 21. Axle 18 extends axially outward from frame 17, and is of sufficient length to provide support and surface for bearings, bushings, or the like for both a tension control section 32 and a torque section 70, which engages spline 21, as will be discussed in detail below. Flange 19 may have a sufficient diameter and thickness to provide additional strength to frame 17 to transfer torque through a set of three radially adjusting legs 22.

Radially adjusting legs 22 (FIG. 2) each have a fixed member 23 that receives a telescoping member 24. Both fixed member 23 and telescoping member 24 have rectangular cross sections and are made of steel, but those skilled in the art will appreciate that other sectional shapes and other materials having the requisite strength may be used as well. Three fixed members 23 are angularly distributed evenly, and are radially oriented lengthwise. The fixed members 23 are rigidly secured to the axially inward surface of frame 17. The radially inner ends of the fixed members 23 may abut one another at approximately the planer-center of frame 17. The radially outer end of each fixed member 23 extends through its respective distal triangular point of frame 17, is draped by frame 17, and receives a telescoping member 24. The fixed members 23 may also be girded for strength at the distal end where a sprung lock pin 25 is received therein.

Figure 1:
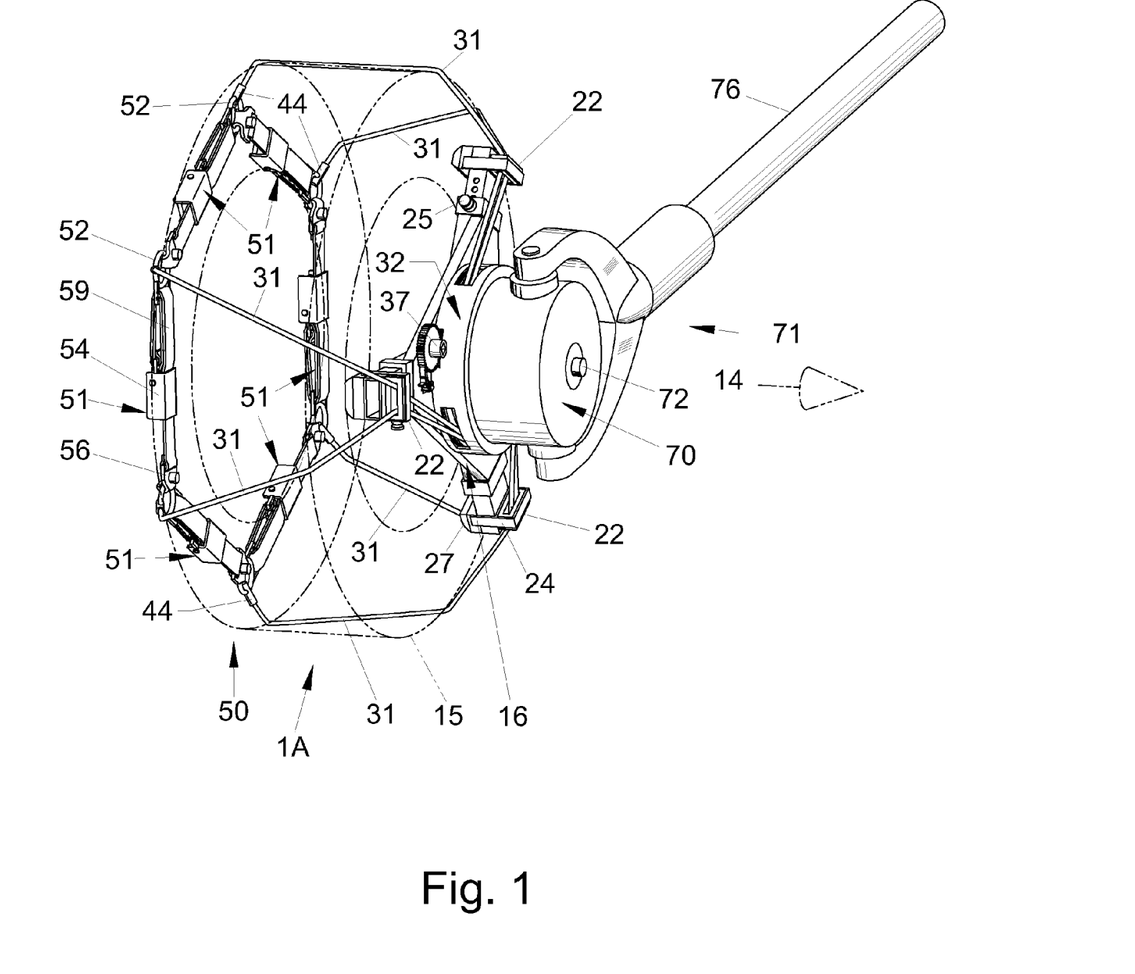
FIG. 1 is a perspective view of a first embodiment of a vehicle mover according to the concepts of the present invention, the vehicle mover positioned on a tire shown in phantom.
Figure 2:
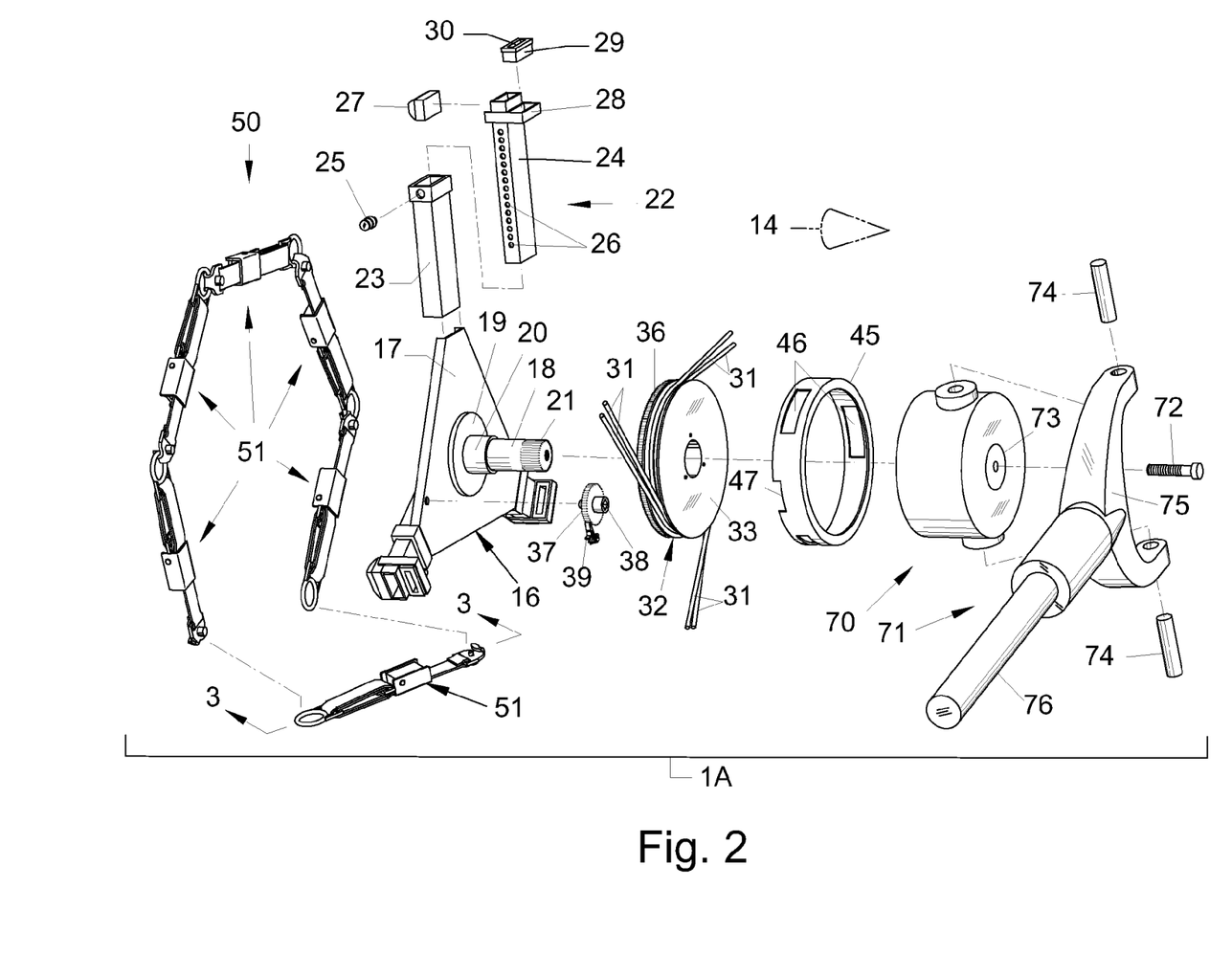
FIG. 2 is an exploded view of the first embodiment of a vehicle mover as shown in FIG. 1.

Telescoping member 24 is movably fitted longitudinally inside fixed member 23, and it is lined with a plurality of spaced position holes 26 along its length (FIG. 2). The position holes are adapted to be engaged by sprung lock pin 25 to allow the length of legs 22 to be adjusted. The radially outer end and axially inward edge surface of telescoping member 24 carries a foot 27 adapted to make contact with the sidewall of a tire 15. The foot 27 is constructed to minimize damage and increase friction with tire 15 (FIG. 1). Foot 27 may be a smooth metal mass, or it may include a rubber surface. A guide support 28 (FIG. 2) is located on the axially outward side of the radially distal end of telescoping member 24. The guide support forms a rectangular slot to receive a replaceable fitted wear guide 29 that is inserted into the slot radially outward to inward. Wear guide 29 may be made of plastic or other well wearing materials known in the art, and may include a slot shaped aperture or a hawse hole 30 through its center that is oriented to guide a set of two linear-force elements 31 from tension control section 32 to the periphery of tire 15 (FIG. 1).

Tension control section 32 includes a spool 33 (FIGS. 2, 7, and 8) that rotates about axle 18 on shoulder 20. Spool 33 may be made of steel or other materials suitable for the intended function. Spool 33 is sized to host a length of a plurality of linear-force elements 31 in a length sufficient to accommodate tires of varying sizes. Spool 33 has an axially-inward flange 34 and an axially-outward flange 35. The axially-inward plane of inward flange 34 includes a main gear 36 with teeth oriented radially outward along the outer circumference.

Main gear 36 is engaged by a tensioning gear 37 (FIG. 2) rotatably mounted to frame 17 adjacent to main gear 36. Tensioning gear 37 includes a square shaped socket slot 38 cut into the axially outward face to allow the use of a common socket wrench (not shown) to turn it. A sprung pawl 39 is pivotally connected to frame 17 adjacent to tensioning gear 37 in order to engage it and directionally lock spool 33. Main gear 36, tensioning gear 37, and pawl 39 may be made of steel or other materials known to those skilled in the art and suitable for the intended function. Spool 33 (FIGS. 7 & 8) has a set of non-threaded bolt holes 40 in inward flange 34 that align with a set of threaded bolt holes 41 in outward flange 35. An anchor bolt 42 is received in each pair of aligned holes 40, 41. Anchor bolts 42 provide an anchor for linear-force elements 31 (FIG. 8), and may be made of steel or other suitable materials.

Figure 5:
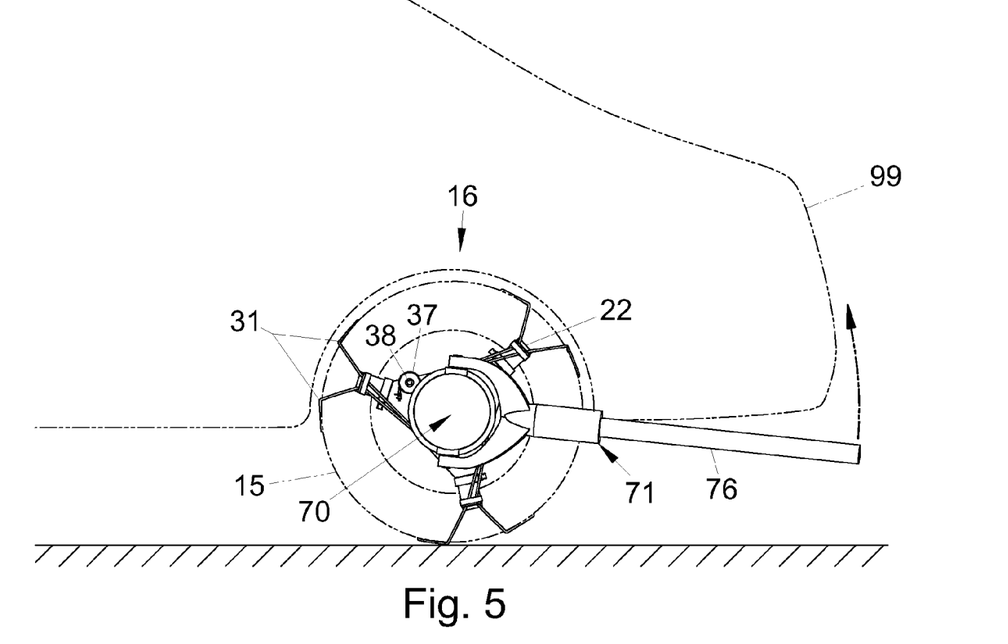
FIG. 5 is a front view of the vehicle mover of the first embodiment positioned on a wheel of a vehicle.
Figure 6:
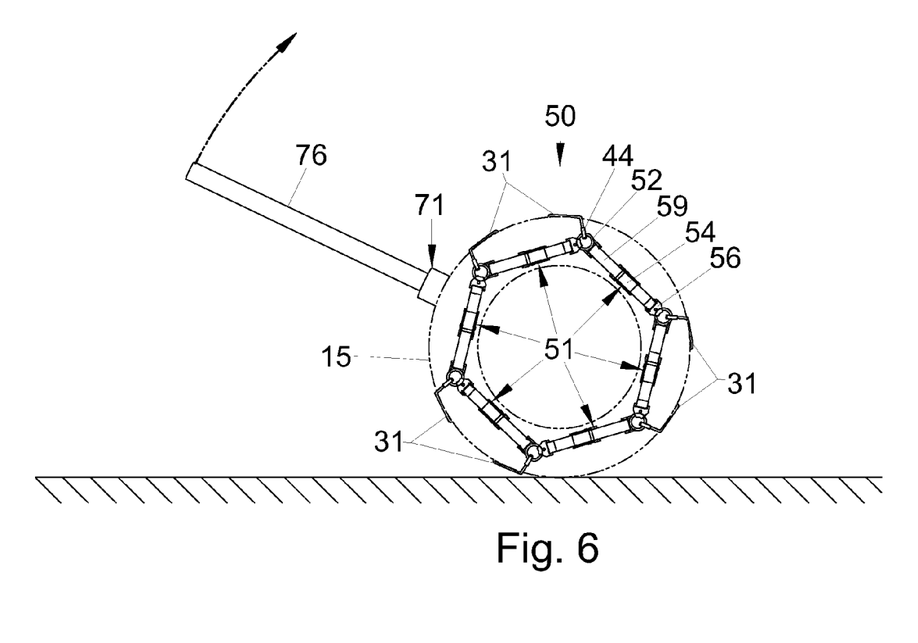
FIG. 6 is an rear view of the vehicle mover of the first embodiment positioned on a wheel of a vehicle.
Figures 7, 8:
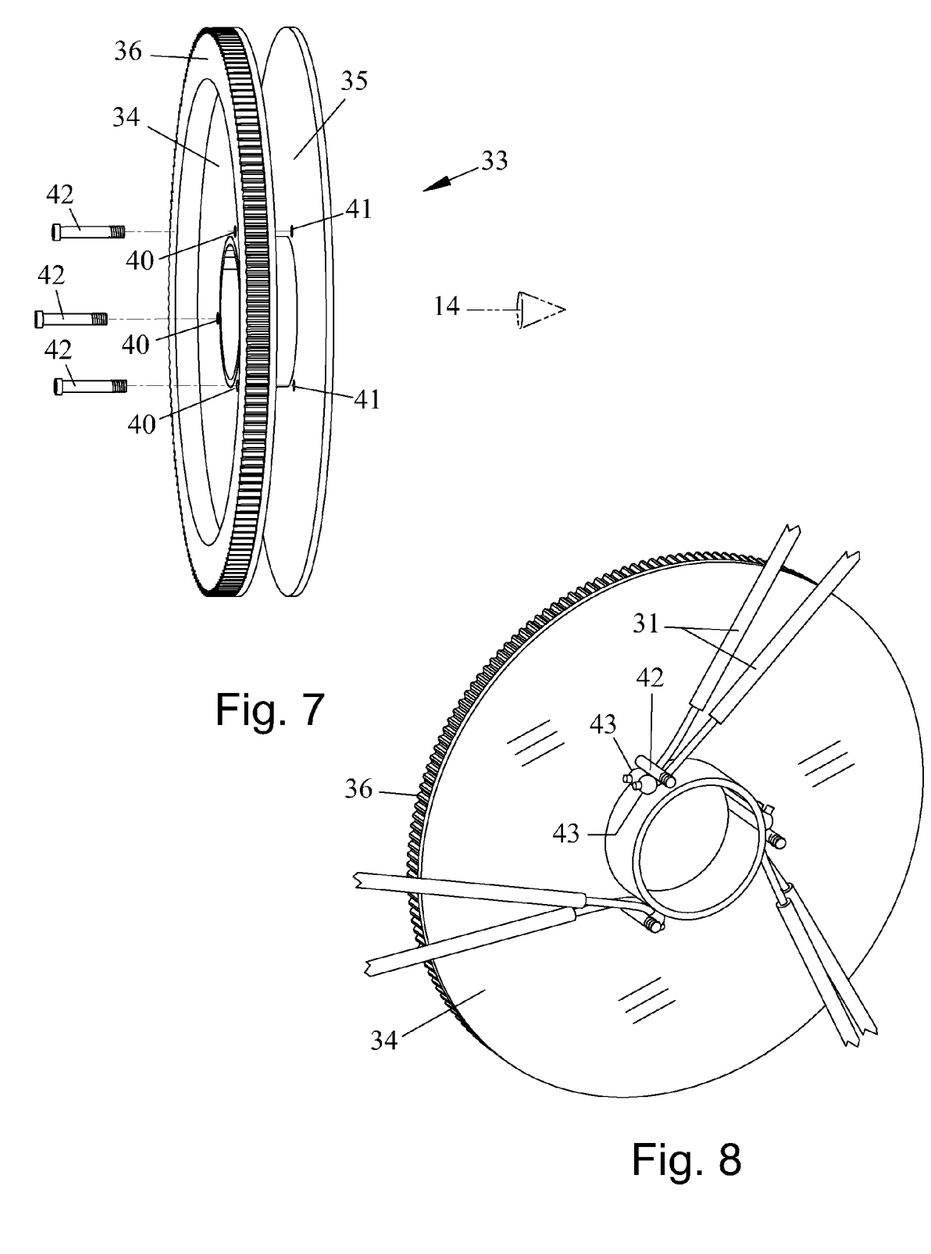
FIG. 7 is a side perspective view of a spool according to the concepts of the first embodiment of the present invention.
FIG. 8 is a perspective view of the spool of FIG. 7 with a flange removed for illustrative purposes.

Linear-force elements 31 each have a ball end 43 and a ring end 44 (FIG. 6). Ball ends 43 are anchored by bolts 42 (FIG. 8). In certain embodiments, linear-force elements 31 may be cable, and may be plastic-coated cable to reduce damage to painted floors or other surfaces. A housing 45 (FIG. 2) surrounds spool 33 to contain slacked linear-force elements 31 therein when there is no load on them. Housing 45 has three ports 46 evenly spaced and radially oriented to legs 22 to allow linear-force elements 31 straight-line access from spool 33 to guide 29. In the embodiment of the invention shown in FIGS. 1-8, two linear-force elements extend from each port 46 and through each guide 29. A notch 47 is also provided in housing 45 to allow tensioning gear 37 to contact main gear 36. Linear-force elements 31 continue from their respective guide 29 and extend radially outward around tire 15 to connect to a ring 52 in a collar 50 (FIGS. 1, 5, & 6). A cylindrical shaped connector is shown as ring end 44 (FIGS. 1 & 6), but other permanent or semi-permanent cable connections may be used at the end of the linear-force elements.

The collar 50 is provided to engage an axially inward surface of tire 15. Collar 50 (FIGS. 1, 2, & 6) consists of a plurality of interconnected collar segments 51. Each collar segment 51 (FIGS. 3 & 4) includes a ring 52, a cam-buckle 54, a clip 56, and a strap 59. Ring 52 has a disc shaped main portion sized slightly larger than the width of strap 59 and a plurality of ring bars 53 rigidly attached and coplanar with the main portion. Ring 52 shown in FIGS. 3 and 4 includes two ring bars, but it is contemplated that more or less may be provided. Ring 52 may be made from metal or other suitable materials. Cam-buckle 54 is a common metal cam-buckle with a cam end 60 and a release end 61 as is known to those skilled in the art. Strap 59 may be any known flat strap, and may be made of nylon. Cam-buckle 54 is fitted with a number of cam-buckle bars 55, similar to ring bars 53, oriented in a straight line through cam-buckle 54 on cam end 60 and rigidly affixed. The locking action of the cam in cam-buckle 54 is oriented to resist strap motion out of release end 61 toward clip 56. Clip 56 may be made of steel, or other materials known to those skilled in the art and suitable for the intended function. Clip 56 has a hook shape at one end to selectively connect clip 56 to ring 52 located in an adjacent collar segment 51, and a single clip bar 57 located on the end opposite the hook. Clip 56 is shown with a sprung gate pin 58 to lock ring 52 into clip 56, but other locking techniques are acceptable such as a spot welded spring metal strip (not shown).

Figure 3:
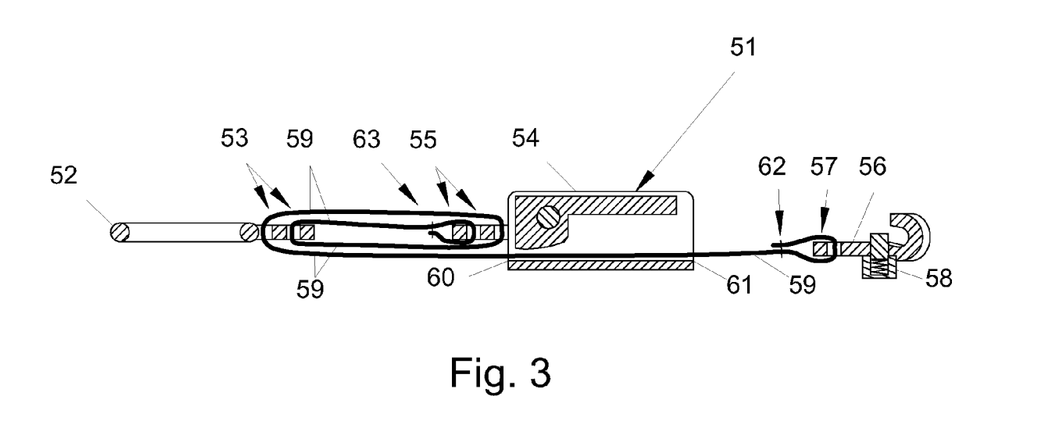
FIG. 3 is an sectional view of a collar segment taken substantially along line 3-3 in FIG. 2.
Figure 4:
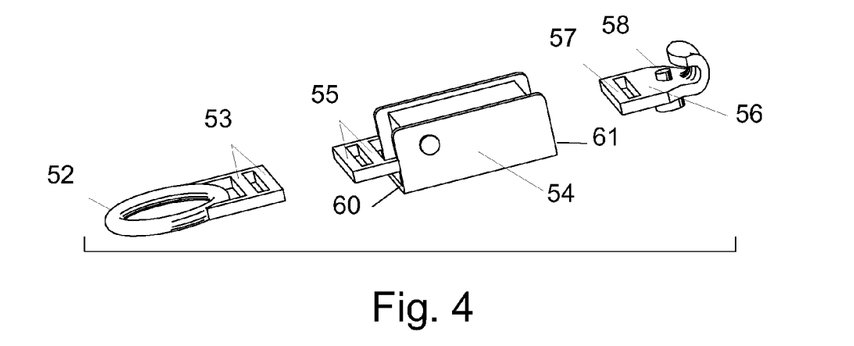
FIG. 4 is a perspective view of a collar segment with the strap removed for illustrative purposes.

Strap 59 has a fixed end 62 and a rigging end 63. Fixed end 62 is looped through the clip bar 57 and stitched to itself. Strap 59 extends from clip bar 57, enters buckle 54 at release end 61, exits cam end 60, and creates a block-and-tackle configuration between ring bars 53 and cam-buckle bars 55 (FIG. 3). Rigging end 63 terminates with stitching securing it to cam-buckle bar 55. This block-and-tackle configuration for strap 59 is for slack storage and not for force advantage, so the number of bars 55 and 57 may be adjusted according to the range of tire-sizes desired for the device (smaller range of tire sizes requires fewer bars 55 and 57).

The torque section 70 may include any known torque transmitting elements. In selecting torque transmitting elements the ability of a user to selectively determine the directionality of engagement of spline 21 by the torque section 70 may be important. Examples of known torque transmitting elements are pawl and sprocket devices, or use of two sprag clutches. One clutch may be provided for each direction, and they may be selectively engaged by a sliding selector gear. Torque section 70 is shown with a single assembly bolt 72 (FIG. 2) located at its axially outward surface. Bolt 72 axially secures torque section 70 to axle 18 by securing a plate 73 against inner bearing races (not shown) to stack them against shoulder 20 so that plate 73 and bolt 72 turn with axle 18 independent of the rest of torque section 70. While a particular attachment mechanism is shown, other known securing mechanisms may also be used to secure torque section 70 to axle 18, such as a C-clip (not shown).

A set of two holes are provided in torque section 70 to receive a torque arm 71, the holes being radially oriented to receive a set of two pivot pins 74 that transmit torque from the torque arm 71. Torque arm 71 has a yoke 75 with a bowed fork-like shape on one end that receives a handle 76 into its other end. The Yoke 75 is pivotally connected radially to torque section 70, normal to direction 14, using the pivot pins 74 that are inserted through yoke 75 and into torque section 70. The magnitude of torque produced is a function of torque arm 71 length, so torque section 70 and torque arm 71 are made to endure substantial force. Handle 76 may be made of metal, but other materials known to those skilled in the art and capable of providing the required strength may be used, such as wood or plastic. Pivot pins 74 may be secured using two roll pins (not shown), or other securing means.

To install the vehicle mover 1A on a vehicle wheel or tire, the telescoping members 24 are adjusted equally so that feet 27 span a smaller diameter than tire 15. Sprung lock pins 25 are used to secure the adjusting members against movement once they have been properly adjusted. Feet 27 are preferably free to move relative to a vehicle's 99 structure (FIG. 5). Collar 50 may then be sized appropriately to fit tire 15 (FIG. 6). If it is too small, contact with inner wheel mechanisms such as brake rotors will cause difficulty. If it is too large, collar 50 may slip over tire 15. The appropriate size may be easily determined where six collar segments are used to form collar 50 by adjusting the distance from ring 52 to adjacent ring 52 to be equal to the radius of tire 15. A single clip 56 is then separated from its associated ring 52. Collar 50 and linear-force elements 31 are positioned around and over tire 15 to the axially inward plane of tire 15, and the separated clip 56 and ring 52 are then reconnected. The torque transmitter 16 is centered on the axially outward plane of tire 15, and a socket wrench is inserted into socket slot 38 to turn tensioning gear 37 and tighten the linear-force elements 31. With feet 27 firmly secured to tire 15 by linear-force elements 31, the torque arm 71 is used to turn tire 15, effectively moving vehicle 99. Removal of the vehicle mover 1A from the vehicle 99 requires the release of sprung pawl 39 to disengage linear force elements 31, and then reverse the installation steps.

The material and structure of foot 27 greatly affects the strength requirements for linear-force elements 31. Maximizing the friction created between foot 27 and tire 15 reduces the load on elements 31, because elements 31 merely manage the axial component of force needed to maintain friction between foot 27 and tire 15. By using a single linear force element per leg 22 (not shown), this axial component effect can be maximized. Alternatively, the use of a wider guide 29 (not shown) would alter the radial angle of elements 31 and enhance the force component effect.

A second embodiment of the vehicle mover is shown in FIGS. 9-13 and is indicated generally by the numeral 78. Unlike vehicle mover 1A, vehicle mover 78 does not include a collar adapted to be positioned on a rear surface of the tire. Furthermore, vehicle mover 78 folds up for easy storage, and does not require a manual torque force. A torque transmitter 16 (FIGS. 9, 11, & 13) of vehicle mover 78 consists of a frame 80 that is generally triangular in shape. Frame 80 may be made from sheet metal, and the perimeter edges may be folded to be perpendicular for added strength. Alternatively, frame 80 may be made from other materials such as, for example, plastic. Frame 80 hosts an alternate axle 81 (FIG. 13) rigidly affixed through its center. Axle 81 has a spline 21 and a flange 19, similar to axle 18 (FIG. 2), and axle 81 may be made of steel. Flange 19 is rigidly affixed to the axially inward plane of frame 80, while spline 21 protrudes through frame 80 in a direction substantially parallel to direction 14.

Figures 12, 13:
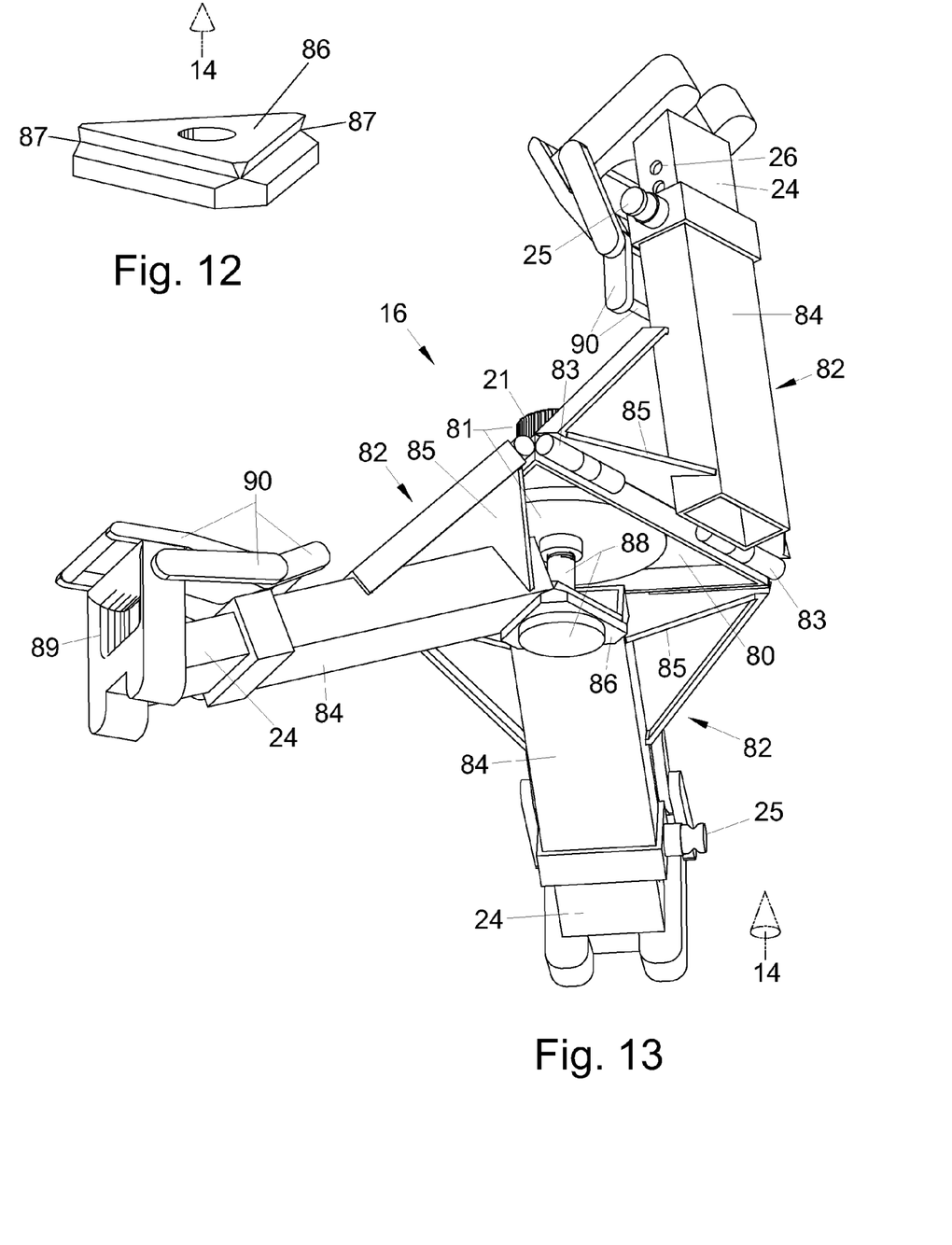
FIG. 12 is a perspective view of an inverted wedge shaped lock according to the concepts of the second embodiment of the invention.
FIG. 13 is a perspective view of the underside of a second embodiment showing a folded section and an unfolded section.

Frame 80 is surrounded by three foldable flaps or leaves 82. Leaves 82 are pivotally connected to frame 80 using a set of steel hinges 83 (FIG. 13). Leaves 82 may be fashioned from sheet metal similar to frame 80 with edges folded to be perpendicular for strength. Each leaf 82 hosts an alternate fixed leg 84 with a gusset 85 supporting the radially inner end of the fixed leg 84. Fixed legs 84 are mounted at an angle relative to the broader plane of leaf 82. Fixed legs 84 may be made of rectangular steel with sufficient thickness to withstand the forces transmitted by the torque transmitter 16.

Figures 9, 10, 11:
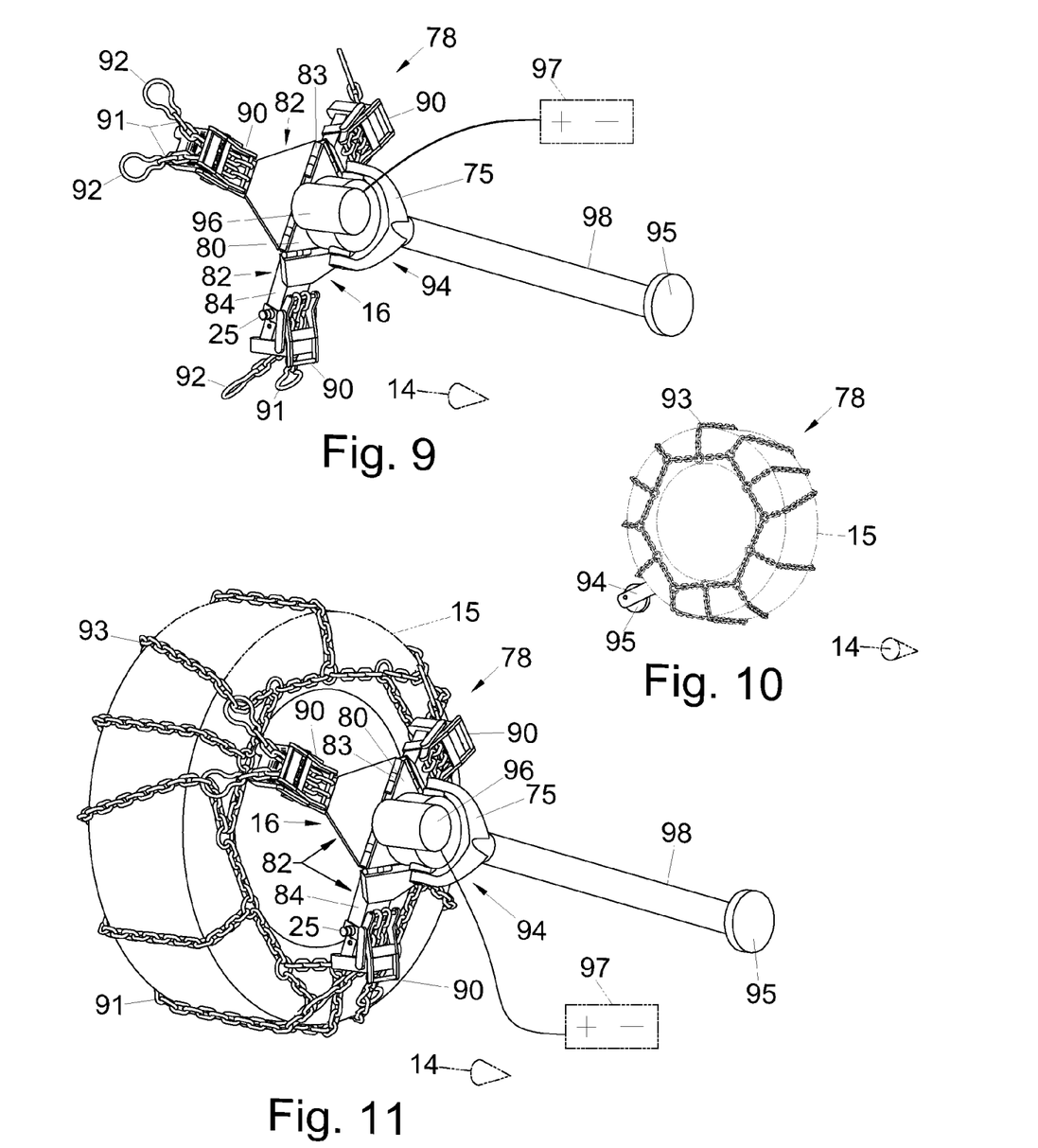
FIG. 9 is a front perspective view of the second embodiment of a vehicle mover according to the concepts of the present invention.
FIG. 10 is a rear perspective view of the vehicle mover according to the concepts of the second embodiment, the vehicle mover positioned on a tire shown in phantom.
FIG. 11 is a front perspective view of the vehicle mover of the second embodiment positioned on a tire shown in phantom.

Fixed legs 84 have a locking system that consists of an inverted-wedge trap 86 (FIGS. 12 & 13) to rigidly maintain leaves 82 in a configuration for use (FIG. 9). The inverted-wedge trap 86 captures a radially inner-most edge of each fixed leg 84 in a groove 87. Trap 86 may be made of metal or other suitable materials known to those skilled in the art. Trap 86 receives a pressure bolt 88 (FIG. 13) axially through its center that is secured to axle flange 19 using threads to hold pressure on trap 86. This pressure exerted by bolt 88 causes the inner-most vertices of fixed legs 84 to squeeze trap 86 radially, thereby locking alternate fixed legs 84 in place. Pressure bolt 88 is shown with a larger head to allow tightening or loosening by hand. Other locking designs are contemplated, such as, for example, locking hinges (not shown).

Fixed leg 84 may be girded at its radially distal end for added strength, and includes a sprung lock pin 25 (FIG. 13). A telescoping member 24 is movably fitted into fixed leg 84. Telescoping member 24 has position holes 26 spaced along its side that align with sprung lock pin 25. The radially distal end of telescoping member 24 consists of a metal hawse hole 89 to guide a set of linear-force elements 91. Hawse hole 89 is shaped at its axially inner end to contact tire 15. Hawse hole 89 may be made from steel, but other suitable materials may also be used. An over-center lock 90 pivots on hawse hole 89 and connects to the radially inner end of linear-force element 91 (FIGS. 9 & 11). Linear-force element 91 passes through hawse hole 89 and has a quick-release coupler 92 at its radially outer end. Linear-force elements are shown as chain links, but may be provided in other forms, such as, for example, metal cables as discussed above with respect to the first embodiment of the invention.

Torque section 94 (FIG. 11) engages spline 21 (FIG. 13) to transmit torque through the linear-force elements 91 to a tire 15. A motor 96 supplies torque to torque section 94, and an electrical source 97 is connected to the motor 96 to provide power. A yoke 75 pivotally connects to torque section 94 by pivot pins (similar to FIG. 2), and a handle 98 extends from yoke 75 and extends radially to provide a brace for torque provided by motor 96. A wheel 95 may be pivotally attached to the radially distal end of handle 98.

In operation, leaves 82 are extended so that the radially inner vertices of fixed legs 84 can be aligned into groove 87. When all of the fixed legs 84 are aligned, pressure bolt 88 is tightened by hand. The telescoping members 24 are adjusted using sprung lock pins 25 so that the axially-inward surface of hawse hole contacts the radially inner edge of tire 15. The vehicle mover 78 may be connected to a conventional set of tire chains 93 positioned around the tire of a vehicle (FIGS. 10 & 11). With tire chains 93 already installed, the quick-release couplers 92 are clipped onto chains 93 so that the apparatus is centered on the axially outer plane of tire 15. Links are chosen in chain 93 so that over-center lock 90 holds a sufficient amount of tension in linear-force elements 91. A turnbuckle adjuster (not shown) is optional, but not required, to fine tune the amount of tension. Motor 96 is engaged to supply torque to turn tire 15, thereby moving a vehicle.

As is apparent from the above description, a device according to the concepts of the present invention allows a single user to easily move a vehicle. This will reduce work related injuries where disabled vehicles are common, but a tow truck is not financially or spatially convenient. The device is universal in that it can be adjusted to fit over wheels of varying sizes and with axles on a single side. In addition, the nature of the terrain affects only the wheel itself and not the operation or performance of the device.

It is contemplated that modifications of the disclosed embodiments are possible without deviating from the scope of the present invention. For example, geometrical alterations such as the number of legs or collar sections are understood to be contained with this disclosure. It is also contemplated that a removal of one or all adjustable features is an obvious embodiment of the device, such as the telescoping member 24 or the adjustable collar segments 51. It is also realized that a coil spring (not shown) added to spool 33 would enhance the installation of the device by rapidly taking in slack in linear-force elements 31. Further, an embodiment is also contemplated that uses a braking system in torque section 70 to that allows a user to engage or disengage spline 21. In addition, it is contemplated that various concepts from the two embodiments of the invention disclosed may be combined or interchanged as necessary and desired.

It is thus evident that a torque transmitter constructed as described herein substantially improves the art. In accordance with the Patent Statutes, only the best mode and preferred embodiment have been presented and described in detail. The invention should not be limited by the drawings or the description provided herein. For an appreciation of the true scope and breadth of the invention, reference should be made only to the following claims.

What is claimed is:

1. An apparatus for moving a vehicle having a wheel with a tire, comprising:
   a. a torque transmitter having a shape adapted to be positioned on an axially outer sidewall of said tire to roll with said tire, said torque transmitter including a frame with a gripping provision adapted to couple said frame to an axially outer torque source, said frame having a tire contact means to support said frame on said sidewall;
   b. a collar adapted to be positioned on an axially inner sidewall of said tire; and
   c. a plurality of flexible linear force elements extending between said torque transmitter and said collar are routed around a radially outer circumferential surface of said tire with substantial radial symmetry among said elements, said linear force elements including a tension means to exact a substantial tension force in said elements between said transmitter and said collar;
   whereby said torque transmitter ensnaring said tire enables said torque source to turn said wheel to move said vehicle.

2. The apparatus of claim 1, wherein said frame including a plurality of radially oriented adjustable legs extending from said frame, and said tire contact means comprising a foot secured to a distal end of each of said adjustable legs on an axial inner edge, said foot being adapted to engage said tire.

3. The apparatus of claim 2, wherein said frame is triangular in shape, and three adjustable legs are provided, each oriented to extend through a point of the triangular frame.

4. The apparatus of claim 2, wherein said tension means comprising a spool carrying said linear force elements, said spool including an inner planar flange and an outer planar flange, said inner flange having a main gear with gear teeth facing radially outward along an outer circumference of said flange, a tensioning gear is adapted to engage said main gear and hold a tension force in said linear force elements.

5. The apparatus of claim 4, wherein said linear force elements extend from said spool, through a guide member located at a distal end of radially adjustable legs, and around said tire to said collar.

6. The apparatus of claim 1, wherein said collar including a plurality of collar segments each having a ring end and a hook end, said segments each joined in series by said ends of respective segments to complete a closed collar.

7. The apparatus of claim 6, wherein said collar segments are adapted to having adjustable lengths.

8. The apparatus of claim 7, wherein six collar segments are provided.

9. An apparatus for moving a vehicle by applying a torque force to a wheel with a tire of said vehicle, the apparatus comprising:
   a. a torque transmitter adapted to be positioned on an outer axial surface of said vehicle wheel, said torque transmitter including a frame, a plurality of radially oriented adjustable legs extending from said frame, and a foot secured to a distal end of each of said adjustable legs on an axial inner edge, said foot being adapted to engage said tire;

b. a torque source engaged with said torque transmitter and adapted to apply a torque force to said torque transmitter; and c. a plurality of linear force elements extending from said torque transmitter and adapted to rotationally engage said wheel to transmit said torque force to move said vehicle.

10. The apparatus of claim 9, further comprising a collar adapted to be positioned on an inner axial surface of said tire, said collar being formed by a plurality of adjustable collar segments connected end to end.

11. The apparatus of claim 9, wherein said torque source includes a radially extending handle.

12. The apparatus of claim 9, wherein said linear force elements are adapted to be connected to a set of tire chains positioned around said wheel.

13. The apparatus of claim 9, further comprising a tension control section adapted to tighten said linear force elements around said tire.

14. An apparatus for moving a vehicle, said vehicle having a wheel with a tire, said apparatus comprising:

a. a frame concentrically juxtaposed and in contact with an axially outer sidewall of said tire, said frame having a smaller diametric dimension than said tire;

b. a gripping provision extends axially outward from said frame away from said wheel;

c. a collar concentrically juxtaposed and in contact with an axially inner sidewall of said tire; and d. a plurality of flexible linear force elements extending between said frame and said collar with a substantial tension force in said elements, each routed around a radially distal circumferential surface of said tire, and spaced with substantial radial symmetry among said elements relative to a rolling axis of said wheel;

whereby a torque source engaging said gripping provision is able to turn said wheel to move said vehicle.

15. The apparatus of claim 14, wherein said frame comprising a plurality of radially adjustable telescoping legs that extend radially from said frame each having a foot attached to a radially distal end of each said leg on an axially inner edge, said foot adapted to contact said tire.

16. The apparatus of claim 15, further comprising a plurality of guides each adapted to be positioned on an axially outer surface of said radially distal end of each said leg respectively, said guide having a slot opened radially, said linear force elements pass through said slot between said frame and said tire and continue to said collar.

17. The apparatus of claim 14, wherein said gripping provision comprising an axle aligned concentrically with a rolling axis of said wheel, an axially inner end of said axle is attached to said frame, said gripping provision located at an axially outer end of said axle.

18. The apparatus of claim 17, further including a spool pivotally and concentrically attached to said axle, a main gear is attached to a planer flange of said spool, and a tensioning gear engages said main gear, said linear force elements are attached to said spool and extend from said spool radially away from said frame.

19. The apparatus of claim 14, wherein said collar comprising a plurality of collar segments, each adapted to be adjustable lengthwise and each having a ring end and a hook end, said segments each joined in series by said ends of respective segments to complete a closed collar.

20. The apparatus of claim 19, wherein six collar segments are used with each respective length set equal to the radius of said tire to facilitate sizing said collar.

* * * * *